July 7, 1970  J. N. BRADFORD ET AL  3,518,828

HYBRID ROCKET MOTOR IGNITION SYSTEM

Filed Sept. 27, 1968  3 Sheets-Sheet 1

INVENTORS
JAMES N. BRADFORD
RICHARD A. JONES
BY Harry A. Herbert Jr.
ATTORNEY

Richard J. Killoe
AGENT

INVENTORS
JAMES N. BRADFORD
RICHARD A. NOKES
BY Harry A. Herbert Jr.
ATTORNEY

Richard J. Killon
AGENT

United States Patent Office 3,518,828
Patented July 7, 1970

3,518,828
HYBRID ROCKET MOTOR IGNITION SYSTEM
James N. Bradford, Sunnyvale, and Richard A. Jones, Los Gatos, Calif., assignors to the United States of America as represented by the Secretary of the Air Force
Filed Sept. 27, 1968, Ser. No. 763,261
Int. Cl. F02k 9/06
U.S. Cl. 60—39.82                    2 Claims

ABSTRACT OF THE DISCLOSURE

An ignition system for a hybrid rocket motor has the oxidizer supplied to the fuel grain port with a predetermined spray cone angle. The fuel-rich products of combustion of a small solid propellent igniter is supplied to the zone adjacent the spray cone wherein the secondary reaction with the oxidizer provides the heat energy to cause ignition between the liquid oxidizer and the solid fuel of the hybrid rocket.

BACKGROUND OF THE INVENTION

Two general methods have been used to accomplish ignition of hybrid motors. In one of these a liquid propellent slug, which reacts hypergolically with the liquid propellant used in the hybrid motor, produces burning between the solid propellant and the liquid propellant of the hybrid motor.

In another method, a small solid propellant charge or pyrogen is used to heat the hybrid fuel until ignition occurs between the fuel and the incoming liquid oxidizer.

SUMMARY OF THE INVENTION

According to the invention, an oxidizer is supplied with a predetermined spray angle into the fuel grain port of a hybrid rocket motor. The fuel-rich products of combustion of small solid propellent igniter are supplied to a recirculating zone adjacent the oxidizer spray so that they come into contact with oxidizer vapors and create a secondary reaction which releases additional heat and thereby provides sufficient energy to heat the solid hybrid fuel and cause ignition between the fuel and the incoming liquid oxidizer. The advantages of this system are extremely smooth starts with no pressure overshoots and reliable ignition at extreme temperatures of −65° F. Also, this eliminates the need for a complex secondary liquid slug start system containing a hypergolic liquid.

DESCRIPTION OF THE PREFERRED EMBODIMENT

Figure 1:
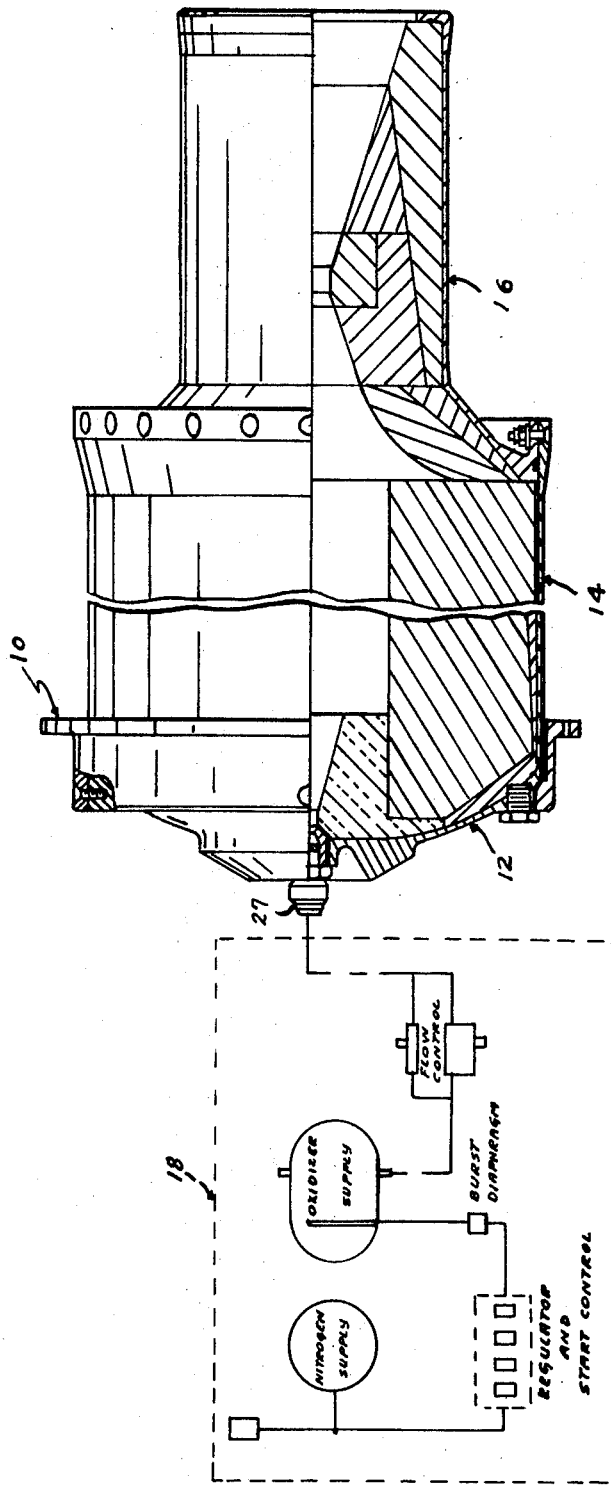
FIG. 1 is a schematic of the liquid oxidizer supply and a partial side view of a hybrid rocket motor, with the center portion cut away, with which the ignition system of the invention is used.
Figure 2:
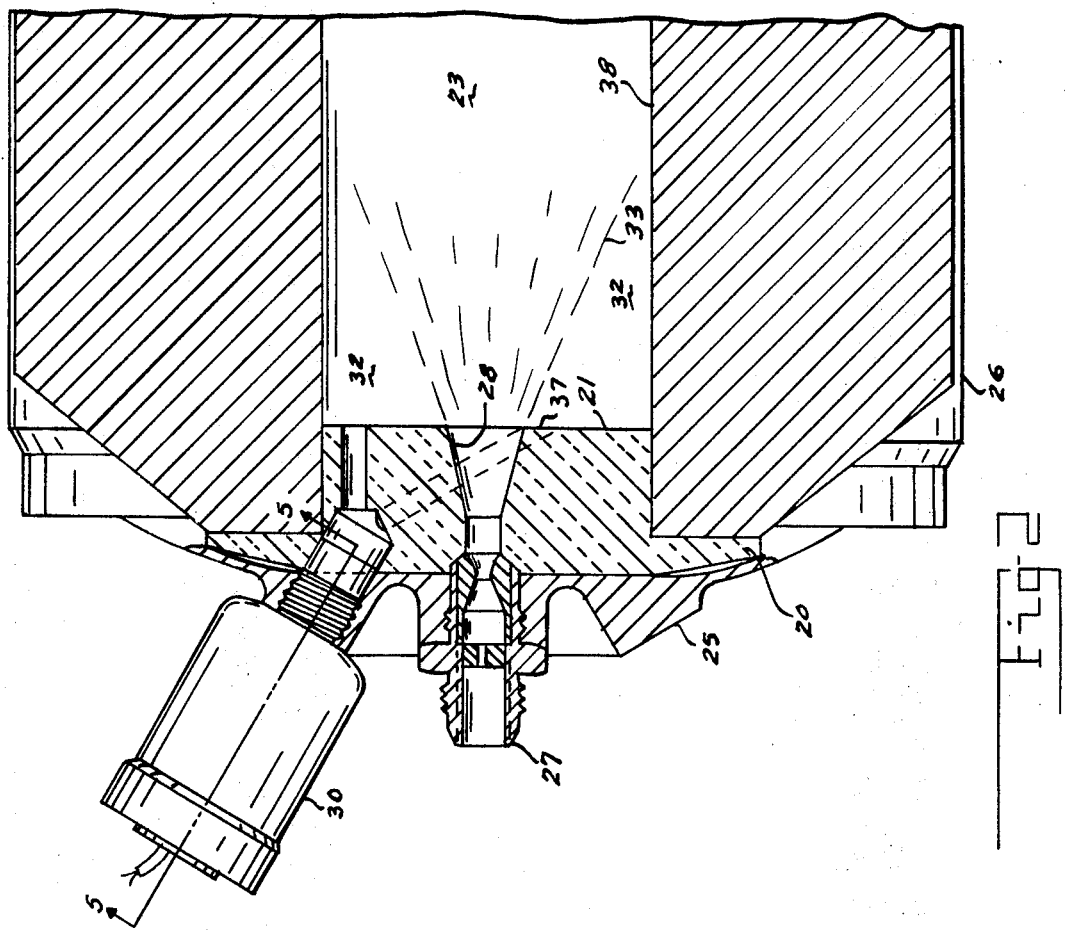
FIG. 2 is a partially cutaway sectional view showing the ignition system for the device of FIG. 1.
Figure 3:
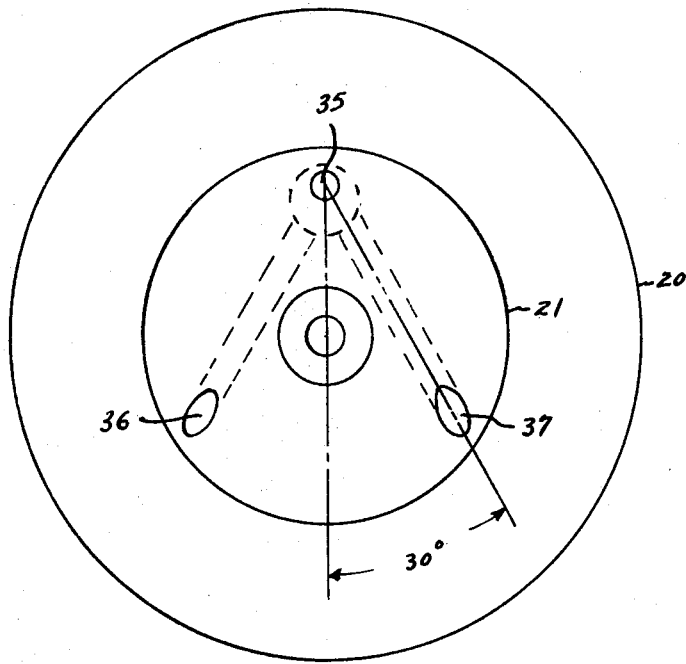
FIG. 3 is an end view of the insulator plate member for the device of FIG. 2.

Reference is now made to FIG. 1 of the drawing which shows a hybrid rocket motor 10 having an ignition section 12, a solid propellent section 14 and a nozzle section 16. Liquid oxidizer is supplied to the ignition section by means of oxidizer supply system shown generally at 18.

The ignition system shown in greater detail in FIGS. 2–5 has a heat insulating closure member 20 with a projection 21 fitting into the fuel grain port 23 of the rocket motor. The insulator 20 may be made of any heat insulation material such as a graphite cloth phenolic insulating material. The member 20 is held in place by means of end plate 25 which is secured to the rocket housing 26. An oxidizer material, such as a mixture of 75% nitrogen tetroxide and 25% nitrous oxide and known as MON-25, is supplied at input 27 from supply 18. A conical nozzle 28 in the insulating member 20 sets the desired oxidizer spray cone angle for the particular rocket. Fuel-rich exhaust gas from a solid propellant igniter 30 are supplied to the recirculation region 32 around the oxidizer spray 33 through channels 35, 36, and 37 in the insulator member 20. The fuel-rich exhaust gas in region 32 comes into contact with oxidizer vapors and creates a secondary reaction which releases additional heat to provide sufficient energy to cause ignition between the solid rocket fuel 38 and the incoming liquid oxidizer. The fuel 38 may be a conventional solid rocket fuel used in hybrid motors such as a mixture of 10% magnesium and 90% polymethylmethacrylate (Plexiglas).

Figure 5:
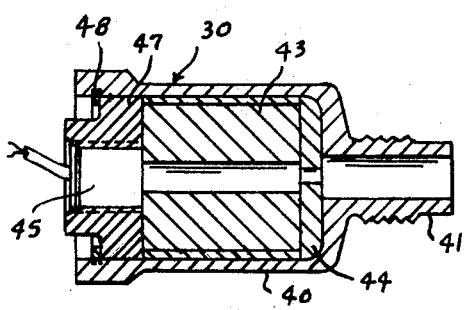
FIG. 5 is a sectional view of the igniter for the device of FIG. 2 along the line 5—5.
Figure 4:
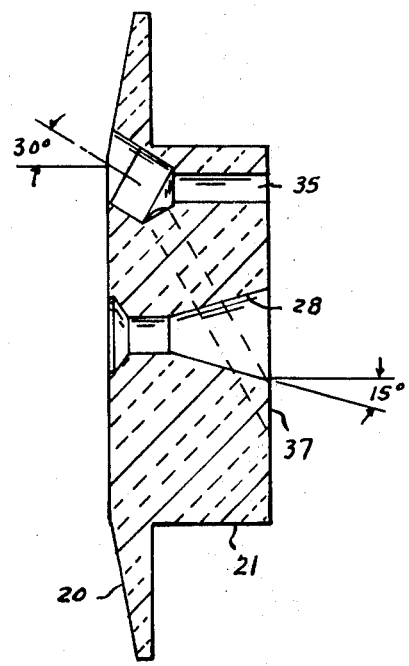
FIG. 4 is a sectional view of the device of FIG. 3 along the line 4—4.

The structure of igniter 30 as shown in greater detail in FIG. 5 has a housing member 40 with a nozzle member 41. A solid propellant 43, which will provide fuel-rich exhaust gas, is positioned within the housing member 41 adjacent a throat insert member 44. One such solid propellant consists of 16% polybutadiene, 16% aluminum and 68% ammonium perchlorate. The solid propellant 43 of igniter 30 is ignited by a conventional electrical squib igniter 45 threaded into end plate 47 which is held in place by a snap ring 48.

There is thus provided an ignition system for hybrid rockets which provides reliable ignition at extreme temperatures.

While certain specific embodiments have been described, it is obvious that numerous changes may be made without departing from the general principles and scope of the invention.

We claim:
1. An ignition system for a hybrid liquid-solid propellent motor having a cylindrical casing with a solid propellent charge having a hollow cavity located within said casing, comprising: a heat insulating closure member closing one end of said hollow cavity; means, in said closure member for providing a conical spray of oxidizer material into said hollow cavity; means, for supplying a liquid oxidizer material to said conical spray means; a solid propellent igniter means, for supplying fuel-rich combustion products to the region, within said hollow cavity, around said conical oxidizer spray whereby the reaction between said oxidizer and said fuel-rich products of combustion supplies heat to cause ignition between said hybrid motor solid propellant and said liquid oxidizer.

2. The device as recited in claim 1 wherein the fuel-rich combustion products of the solid propellent igniter are supplied to the region around the conical oxidizer spray through a plurality of passages having their outputs equally spaced around said conical spray of oxidizer material.

References Cited

UNITED STATES PATENTS

| | | | |
|---|---|---|---|
| 3,136,119 | 6/1964 | Avery | 60—251 |
| 3,178,885 | 4/1965 | Loughran | 60—251 |
| 3,274,775 | 9/1966 | Berton | 60—39.82 |
| 3,349,562 | 10/1967 | Williams | 60—39.47 |

CARLTON R. CROYLE, Primary Examiner

D. HART, Assistant Examiner

U.S. Cl. X.R.

60—251